3,328,392
3-AMIDOCYCLOBUTANONE AND 3-AMIDO-
CYCLOBUTANOL COMPOUNDS
James C. Martin, Kingsport, Tenn., assignor to Eastman
Kodak Company, Rochester, N.Y., a corporation of
New Jersey
No Drawing. Filed Dec. 9, 1963, Ser. No. 329,234
18 Claims. (Cl. 260—239.3)

This invention relates to novel chemical compounds and to their preparation. More particularly, it relates to novel 3-amidocyclobutanone and 3-amidocyclobutanol compounds and to their preparation.

The novel 3-amidocyclobutanone and 3-amidocyclobutanol compounds of the invention have the formulas:

I.

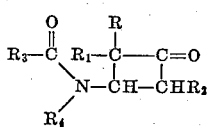

and

II.

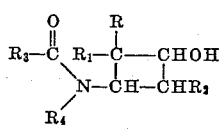

respectively, wherein R and $R_1$ each represents hydrogen or a monovalent organic radical or collectively together with the carbon atom of the cyclobutane ring to which they are attached, form a carbocyclic ring, wherein $R_2$ is hydrogen or an alkyl radical and wherein $R_3$ and $R_4$ each represent an alkyl radical or an aryl radical and when taken collectively represent a linear alkylene radical having 3 to 5 carbon atoms which forms with the carbon and nitrogen atoms to which they are attached a saturated heterocyclic ring having 5 to 7 ring atoms. The substituents R and $R_1$ can be the same or different. Similarly, the substituents $R_3$ and $R_4$ can be the same or different.

In the formulas given hereinbefore R and $R_1$ each typically represent: (a) an alkyl radical having 1 to 8 carbon atoms; (b) a phenyl radical; (c) an alkoxyphenyl radical; (d) an allyl radical; (e) a carbalkoxy radical wherein the alkoxy moiety has 1 to 8 carbon atoms or (f) hydrogen, and wherein R and $R_1$ collectively, together with the carbon atom of the cyclobutane ring to which they are attached, can be a carbocyclic ring containing 5 to 7 carbon atoms in the ring such as cyclopentylidene, cyclohexylidene, cycloheptylidene and related rings; $R_2$ is typically hydrogen or an alkyl radical having 1 to 4 carbon atoms; and $R_3$ and $R_4$ each typically represent: (a) an alkyl radical having 1 to 4 carbon atoms; (b) a phenyl radical and (c) a substituted phenyl radical such as a methylphenyl radical or an alkoxyphenyl radical, such as a methoxyphenyl radical or an ethoxyphenyl radical, for example.

The cyclobutanone compounds having the Formula I can be prepared by combining a ketene having the Formula III and an N-vinylamide haivng the Formula IV. The reaction which takes place can be represented by the following equation wherein the substituents in the formulas are those as described hereinbefore.

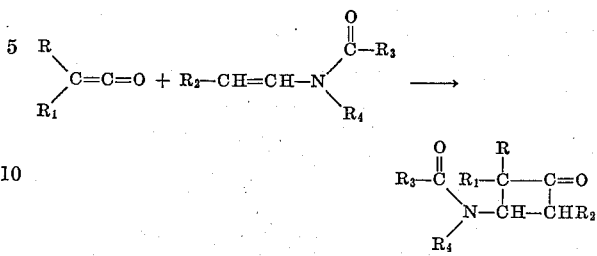

When the substituents R and $R_1$ are alkyl they are usually alkyl of 1 to 8 carbon atoms such as methyl, ethyl, propyl, isopropyl, butyl, sec. butyl, tert. butyl, pentyl, hexyl, heptyl, octyl, 2-ethylhexyl, etc. although they can be a higher alkyl radical such as nonyl, decyl, undecyl, dodecyl, tridecyl, pentadecyl and octadecyl, for example. In general, the substituents R and $R_1$, when alkyl, are preferably lower alkyl, e.g., of 1 to about 4 carbon atoms.

When the substituents R and $R_1$ are carbalkoxy the alkyl moiety is preferably lower alkyl.

Typical examples of ketenes having the Formula III include ketene and various aldoketenes and ketoketenes such as methylketene,
ethylketene,
propylketene,
isopropylketene,
butylketene,
isobutylketene,
pentylketene,
hexylketene,
heptylketene,
octylketene,
phenylketene,
dimethylketene,
ethylmethylketene,
diethylketene,
ethylbutylketene,
dipropylketene,
ethylisopropylketene,
diisobutylketene,
dibutylketene,
di(tert.butyl)ketene,
dipentylketene,
dihexylketene,
diheptylketene,
dioctylketene,
di(2-ethylhexyl)ketene,
ethyldodecylketene,
dioctadecylketene,
camphoketene,
dibenzylketene,
ditolylketene,
diallylketene,
dicarbethoxyketene,
tetramethyleneketene,
pentamethyleneketene,
hexamethyleneketene,
diphenylketene,
di(p-methoxyphenyl)ketene, methylphenylketene,
allylmethylketene,
methylcarbethoxyketene,
ethylcarbethoxyketene,
propylcarbomethoxyketone, and the like.

N-vinylamide compounds that can be used in the preparation of the new 3-amidocyclobutanone compounds of the invention include N-methyl-N-vinylacetamide,
N-ethyl-N-vinylacetamide,
N-propyl-N-vinylacetamide,
N-isopropyl-N-vinylacetamide,
N-butyl-N-vinylacetamide,
N-tertiarybutyl-N-vinylacetamide,
N-phenyl-N-vinylacetamide,
N-p-tolyl-N-vinylacetamide,
N-p-methoxyphenyl-N-vinylacetamide,
N-p-ethoxyphenyl-N-vinylacetamide,
N-methyl-N-(1-propenyl)acetamide,
N-propyl-N-(1-propenyl)acetamide,
N-butyl-N-(1-propenyl)acetamide,
N-phenyl-N-(1-propenyl)acetamide,
N-ethyl-N-(1-butenyl)acetamide,
N-propyl-N-(1-butenyl)acetamide,
N-phenyl-N-(1-butenyl)acetamide,
N-methyl-N-(1pentenyl)acetamide,
N-butyl-(1-pentenyl)acetamide,
1-vinyl-2-pyrrolidone,
1-(1-propenyl)-2-pyrrolidone,
1-(1-butenyl)-2-pyrrolidone,
1-(1-pentenyl)-2-pyrrolidone,
N-methyl-N-vinylbenzamide,
N-propyl-N-vinylbenzamide,
N-butyl-N-vinylbenzamide,
N-phenyl-N-vinylbenzamide,
N-methyl-N-(1-propenyl)benzamide,
N-butyl-N-(1-propenyl)benzamide,
N-tertiarybutyl-N-(1-propenyl)benzamide,
N-methyl-N-(1-butenyl)-benzamide,
N-butyl-N-(1-butenyl)benzamide,
N-methyl-N(1pentenyl)-benzamide,
N-methyl-N-(1-pentenyl)-benzamide,
N-methyl-N-vinylpropionamide,
N-ethyl-N-vinylpropionamide,
N-butyl-N-vinylpropionamide,
N-methyl-N-vinylbutyramide,
N-ethyl-N-vinylbutyramide,
N-butyl-N-vinylbutyramide,
N-methyl-N-vinylvaleramide,
N-ethyl-N-vinylvaleramide,
N-butyl-N-vinylvaleramide,
N-phenyl-N-(1-propenyl)benzamide,
N-phenyl-(1-butenyl)benzamide,
N-(1-pentenyl)benzamide,
N-methyl-N-vinyl-o-toluamide,
N-methyl-N-vinyl-p-toluamide,
N-butyl-N-vinyl-m-toluamide,
N-phenyl-N-vinyl-p-toluamide,
N-phenyl-N-(1-propenyl)-p-toluamide,
N-methyl-N-vinyl-o-methoxybenzamide,
N-methyl-N-vinyl-m-methoxybenzamide,
N-phenyl-N-vinyl-p-methoxybenzamide,
N-vinyl-ε-caprolactam,
N-(1-propenyl)-ε-caprolactam,
N-(1-pentenyl)-ε-caprolactam,
1-vinyl-2-piperidone,
1-(1-propenyl)-2-piperidone,
1-(1-pentenyl)-2-piperidone, etc.

In accordance with customary practice when a specific alkyl group is referred to herein the normal form is intended unless otherwise indicated.

The novel 3-amidocyclobutanol compounds of the invention can be prepared by selectively reducing the novel 3-amidocyclobutanone compounds of the invention. In the reduction the carbonyl group of the 3-amidocyclobutanone compound is reduced to a hydroxymethylene group without reducing the carbonyl group present in the amido grouping attached to the 3-position of the cyclobutanone compound. The reduction can be effected in any suitable manner desired. It can be effected, for example, by using hydrogen under pressure with metallic catalysts such as ruthenium, Raney nickel, Raney cobalt, various supported nickel catalysts, palladium, etc. The reduction can also be carried out with hydrogen at low pressures employing catalysts such as platinum or palladium. Reagents such as sodium and potassium borohydrides also can be used to effect the reduction.

The novel 3-amidocyclobutanol compounds obtained by catalytic reduction of the novel 3-amidocyclobutanone compounds of the invention are believed to be mixtures of cis-trans isomers. No attempt has been made to separate these isomers.

In accordance with a process of the invention, the new 3-amidocyclobutanone compounds are prepared by reacting the ketene and the N-vinylamide at a temperature at which the reactants are fluids and below the decomposition temperatures. Equimolar ratios of the reactants are generally employed. After completion of the reaction the resulting 3-amidocyclobutanone is isolated, for example, by recrystallization or distillation.

Suitable temperatures for the reaction are in the range of about 10° C. to about 180° C. For the most reactive ketenes such as ketene, diphenylketene and certain dialkylketenes (alkyl of 1–3 carbon atoms) a reaction temperature of about 10° C.–40° C. is satisfactory; but for ketenes less reactive than those just mentioned, such as dialkylketenes having an alkyl group containing four or more carbon atoms, e.g. ethylbutylketene higher reaction temperatures are preferred e.g. 60° C. to 180° C., preferably about 60° C. to about 120° C.

The reaction can be carried out with or without a solvent. Suitable inert solvents include, for example, diethyl ether, diisopropyl ether, dioxane, tetrahydrofuran, diethylketone, methylisobutylketone, hexane, naphtha, isooctane, benzene, toluene, xylene, carbon tetrachloride, chloroform, tetrachloroethane, dimethyl formamide, dimethyl sulfoxide acetonitrile, isobutyronitrile, ethyl acetate, butyl acetate, ethylene carbonate, etc. Solvents with an active hydroxyl group, e.g. water and ethyl alcohol, should be avoided.

The novel 3-amidocyclobutanone compounds of the invention are useful as chemical intermediates. As noted hereinbefore, they can be reduced to the corresponding 3 - amidocyclobutanols. 2,2 - dimethyl-3-(N-propylacetamido)cyclobutanone, for example, has utility as a plasticizer for cellulose acetate butyrate. The novel 3-amidocyclobutanol compounds of the invention are useful as plasticizers for cellulose ester resins, such as cellulose acetate, cellulose acetate butyrate or cellulose acetate propionate. The novel 3-amidocyclobutanol compounds of the invention can be converted to useful surfactants by sulfation, e.g. with concentrated $H_2SO_4$ and conversion to the sodium sulfate salt.

The following examples illustrate the invention:

*Example 1*

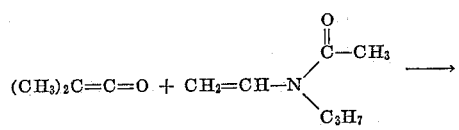

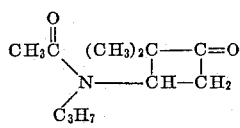

To a stirred solution of 55.9 g. (0.44 mole) of N-propyl-N-vinyl-acetamide in 200 ml. of benzene was added 35 g. (0.5 mole) of dimethylketene. The reaction was slightly exothermic. The temperature rose from 25° C. to 35° C. over a period of 2 hours. After being stirred for 12 hours, the reaction solution was distilled through a 12-in. Vigreux column to give a considerable amount of dimethylketene dimer, 22.9 g. (41%) of N-propyl-N-vinyl-acetamide and 42.0 g. (48%) of 2,2-dimethyl-3-(N-propyl-acetamido)cyclobutanone, B.P. 126° C.–128° C. (1.5 mm.), $n_D^{20}$ 1.4758.

*Example 2*

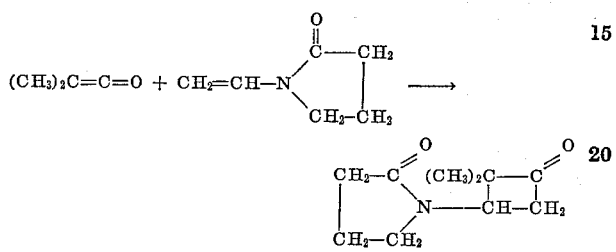

To a stirred solution of 111 g. (1.0 mole) of 1-vinyl-2-pyrrolidone in 300 ml. of acetonitrile was added 70 g. (1.0 mole) of dimethylketene. The reaction solution was stirred at room temperature for 2 hours and then refluxed for 2 hours. Distillation through a 12-in. packed column gave a considerable amount of dimethylketene dimer, 61 g. (55%) of recovered 1-vinyl-2-pyrrolidone and 55 g. (30%) of 2,2-dimethyl - 3 - (2 - oxopyrrolidinyl)cyclobutanone, B.P. 138° C.–140° C. (0.5 mm.), $n_D^{20}$ 1.4951.

*Example 3*

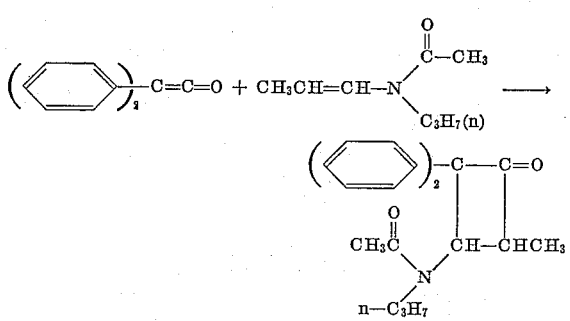

A mixture of 9.7 g. (0.05 mole) of diphenylketene and 7.05 g. (0.05 mole) of N-n-propyl-N-(1-propenyl)acetamide crystallized to a hard solid after standing at room temperature for 2 days. Practically a quantitative yield of crude 4-methyl-2,2-diphenyl-3-(N-propylacetamido)cyclobutanone, M.P. 156–159° C. was obtained. Two recrystallizations from benzene gave material with M.P. 161–162° C.

*Example 4*

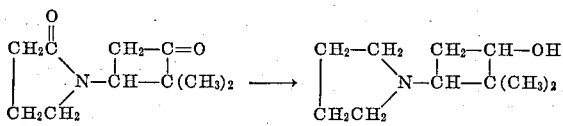

To a stirred suspension of 3.1 g. (.08 mole) of lithium aluminum hydride in 50 ml. of tetrahydrofuran was added a solution of 10 g. (.055 mole) of 2,2-dimethyl-3-(2-oxopyrrolidinyl)cyclobutanone in 50 ml. of tetrahydrofuran. The temperature was kept at 10–20° C. during the addition. The reaction mixture was then refluxed for 1 hour and cooled. Ethylacetate was added to destroy excess lithium aluminum hydride; this was followed by 3 ml. of water, 2.5 ml. of 20% sodium hydroxide and 12 ml. of water. The solid was removed by filtration and washed with several portions of tetrahydrofuran. The solvent was removed from the combined filtrates and the product was isolated by means of a preparative scale gas chromatography column. This reaction product was 2,2-dimethyl-3-pyrrolidinylcyclobutanol.

*Example 5*

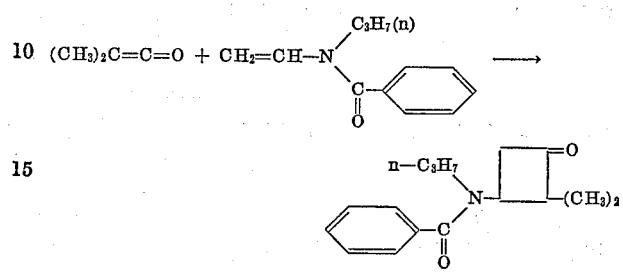

To a stirred solution of 100 g. (0.53 mole) of N-n-propyl-N-vinylbenzamide in 200 ml. of benzene under nitrogen was added 37 g. (0.53 mole) of dimethylketene. The reaction temperature slowly rose to 40° C. After stirring for 5 hours, the solution was distilled through a 12-in. packed column to recover 30 g. of N-n-propyl-N-vinylbenzamide, B.P. 82–83° C. (.08 mm.). When the pot temperature reached 170° C. the distillation was stopped and the residue allowed to cool. The residue weighed 83 g. (86%) and was crude 2,2-dimethyl-3-(N-n-propylbenzamido)cyclobutanone, M.P. 59–64° C. Two recrystallizations from hexane gave an analytical sample, M.P. 65–66.5° C.

*Example 6*

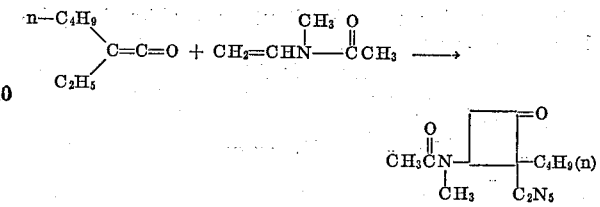

A solution of 63 g. (0.5 mole) of n-butylethylketene and 49.5 g. (0.5 mole) of N-methyl-N-vinylacetamide in 100 ml. of acetonitrile was refluxed for 24 hours. Distillation of this solution through a 10-in. packed column gave 69.8 g. (62%) of 2-n-butyl-2-ethyl-3-(N-methylacetamido)cyclobutanone, B.P. 140–142° C. (1.2 mm.).

*Example 7*

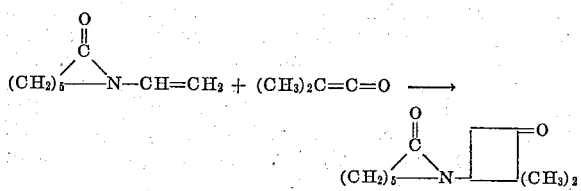

By the general method given in Example 2, 69.5 g. (0.5 mole) of N-vinyl ε-caprolactam and 35 g. (0.5 mole) of dimethylketene in 200 ml. of dimethylacetamide gave 51.3 g. of N-(2,2-dimethyl-3-oxocyclobutyl)-ε-caprolactam, B.P. 151–154° C. (0.3 mm.).

*Example 8*

Twenty parts of 2,2-dimethyl-3-(N-n-propylacetamido)cyclobutanone and 80 parts of cellulose acetate butyrate are milled together on heated rolls. The resulting plasticized resin is quite tough, has a good appearance and is easy to mold.

Example 9

Under the general conditions of Example 6 the following ketenes and N-vinylamides react to give the products shown:

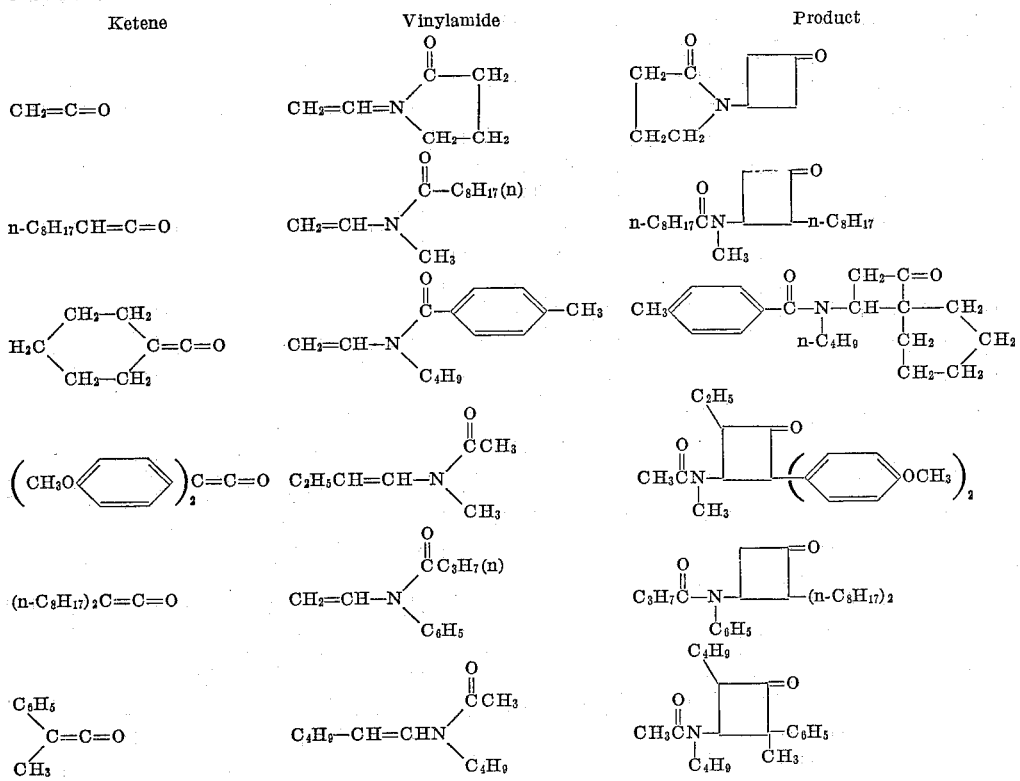

The following examples illustrate the 3-amidocyclobutanol compounds of the invention and their preparation.

Example 10

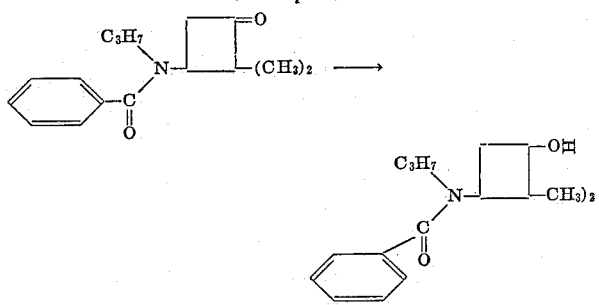

To a solution of 12.3 g. (.05 mole) of 2,2-dimethyl-3-(N-propylbenzamido)cyclobutanone in 30 ml. of ethyl alcohol was added slowly with stirring a solution of 0.76 g. (.02 mole) of sodium borohydride in 5 ml. of water. The reaction solution was stirred for 1 hour at room temperature and then evaporated on a steam bath. The residue was taken up in ether, washed with water and dried over anhydrous sodium sulfate. Distillation of this solution gave 9.8 g. (80%) of 2,2-dimethyl-3-(N-propylbenzamido)cyclobutanol, B.P. 192–196° (1 mm.) as a clear, very viscous distillate.

Analysis.—Calcd. for $C_{16}H_{23}NO_2$: C, 73.6; H, 8.8; N, 5.4. Found: C, 73.4; H, 8.8; N, 5.3. Infrared maxima at $3.0\mu$ (—OH) and $6.2\mu$

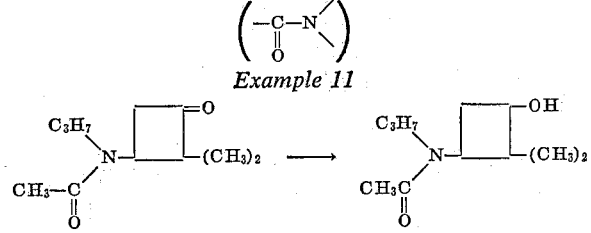

Example 11

A solution of 30 g. of 2,2-dimethyl-3-(N-propylacetamido)cyclobutanone in 70 ml. of ethyl alcohol was hydrogenated in a rocking autoclave at 100° C. and 3000 p.s.i. over 5 g. of a 5% ruthenium on carbon catalyst. This reaction solution was filtered to remove the catalyst and the filtrate was distilled through a 10-in. packed column to give 25.2 g. (81%) of 2,2-dimethyl-3-(N-propylacetamido)cyclobutanol, B.P. 143° (0.8 mm.), $n_D^{20}$ 1.4845.

Analysis.—Calcd. for $C_{11}H_{21}NO_2$: C, 66.4; H, 10.5; N, 7.0. Found: C, 66.2; H, 10.7; N, 6.9. Infrared maxima at $2.95\mu$ (—OH) and $6.15\mu$

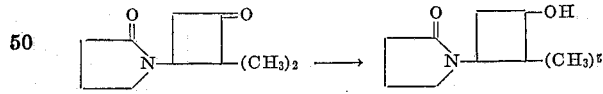

Example 12

A solution of 25 g. of 2,2-dimethyl-3-(2-oxopyrrolidinyl)-cyclobutanone in 50 ml. of ethyl acetate was hydrogenated in a rocking autoclave at 70° C. and 1500 p.s.i. over 4 g. of Raney nickel. The reaction solution was filtered to remove the catalyst and the filtrate was distilled through a 6-in. Vigreux column to give 18.5 g. (72%) of 2,2-dimethyl-3-(2-oxopyrrolidinyl)cyclobutanol, B.P. 134–136° (3 mm.).

Other 3-amidocyclobutanone and 3-amidocyclobutanol compounds of the invention that can be prepared in accordance with the teachings of the invention include N-(2,2-diphenyl-3-oxocyclobutyl)-ε-caprolactam,
4-methyl-3-(2-oxopyrrolidinyl)cyclobutanone,
4-propyl-3-(N-butylacetamido)cyclobutanone,
4-butyl-3-(N-methylacetamido)cyclobutanone,
2,2-diphenyl-3-(N-methylpropionamido)cyclobutanone,
2,2-dimethyl-3-(N-methylbutyramido)cyclobutanone,
2,2-diphenyl-3-(N-methylvaleramido)cyclobutanone,
2,2-dibutyl-3-(N-methylacetamido)cyclobutanone,
4-methyl-2,2-diphenyl-3-(N-propylacetamido)cyclobutanol
2-butyl-2-ethyl-3-(N-propylacetamido)cyclobutanol, N-(2,2-dimethyl-3-hydroxycyclobutyl)-ε-caprolactam,
3-(2-oxopyrrolidinyl)cyclobutanol,
2-octyl-3-(N-methylnonanamido)cyclobutanol,
4-ethyl-2,2-di-p-methoxyphenyl-3-(N-methylacetamido)cyclobutanol,
2,2-dioctyl-3-(N-phenylacetamido)cyclobutanol,
4-methyl-3-(2-oxopyrrolidinyl)cyclobutanol,
4-propyl-3-(N-butylacetamido)cyclobutanol,
4-butyl-3-(N-methylacetamido)cyclobutanol,
2,2-diphenyl-3-(N-methylpropionamido)cyclobutanol,
2,2-dimethyl-3-(N-methylbutyramido)cyclobutanol,
2,2-diphenyl-3-(N-methylvaleramido)cyclobutanol,
2,2-dibutyl-3-(N-methylacetamido)cyclobutanol,
N-(2,2-diphenyl-3-hydroxycyclobutyl)-ε-caprolactam
1-hydroxy-3-(N-butyl-p-methylbenzamido)-spiro[3.5]
nonane, etc.

The analyses for the products of Examples 1, 2, 3, 4 and 5 are set forth hereinafter.

*Example 1*

*Analysis.*—Calcd. for $C_{11}H_{19}NO_2$: C, 67.0; H, 9.6; N, 7.1; mol. wt., 197. Found: C, 66.7; H, 9.8; N, 7.0; mol. wt. (B.P. elevation in benzene), 198.

*Example 2*

*Analysis.*—Calcd. for $C_{11}H_{19}NO_2$: C, 66.3; H, 8.3; N, 7.7. Found: C, 66.1; H, 8.4; N, 7.7.

*Example 3*

*Analysis.*—Calcd. for $C_{22}H_{25}NO_2$: C, 78.8; H, 7.5; N, 4.2. Found: C, 79.0; H, 7.1; N, 4.0.

*Example 4*

*Analysis.*—Calcd. for $C_{10}H_{19}NO$: C, 71.0; H, 11.2; N, 8.3. Found: C, 71.2; H, 11.2; N, 8.4.

*Example 5*

*Analysis.*—Calcd. for $C_{16}H_{21}NO_2$: C, 74.1; H, 8.1; N, 5.4. Found: C, 74.4; H, 8.0; N, 5.5.

As shown by Example 4 both carbonyl groups present in the 3-amidocyclobutanone compounds of the invention can be reduced by the use of lithium aluminum hydride as a reducing agent. The product of this example is claimed by Brannock and Martin copending application Ser. No. 112,794 filed May 26, 1961. It is useful as a stabilizer for fuel oil.

The ketene compounds employed in the preparation of the novel compounds of the invention can be prepared by methods known in the art, for instance, by methods described in "Organic Reactions," John Wiley and Sons, Inc., N.Y. (1946), vol. III, Chapter 3. The disubstituted ketene reactants can also be prepared by the method described in copending application, Hasek and Elam, Ser. No. 841,961, filed Sept. 24, 1959 and in Hasek and Elam Canadian Patent 618,772.

The N-vinylamide intermediate compounds in general can be prepared by vinylation of amides with acetylene.

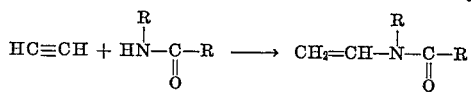

wherein R stands for alkyl, aryl, etc. This reaction is disclosed in U.S. Patent No. 2,317,804 and German Patent No. 744,414, for example.

Another general method of preparation for N-vinylamide compounds involves the reaction of acyl halides with N-alkylaldimines.

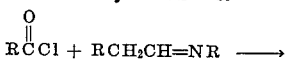

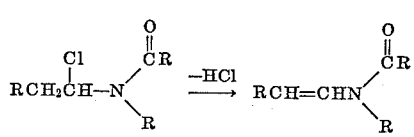

wherein R stands for alkyl, aryl, etc. This method was reported by H. Breederveld in Rec. Trav. Chim., 79, 1197–1202 (1960). N-propyl-N-(1-propenyl)acetamide (Example 3) and N-propyl-N-vinylbenzamide (Example 5) were made according to this procedure. N-propyl-N-vinylacetmide (Example 1) was prepared by the reaction of acetic anhydride with N-ethylidenepropylamine according to the method of H. Breederveld, Rec. Trav. Chim., 79, 402–407 (1960). These last two methods are quite general and can be used to prepare most of the N-vinylamide compounds referred to herein.

Although the invention has been described in considerable detail with particular reference to certain preferred embodiments thereof, variations and modifications can be effected within the spirit and scope of the invention as described hereinbefore, and as defined in the appended claims.

I claim:

1. The 3-amidocyclobutanone compounds having the formula:

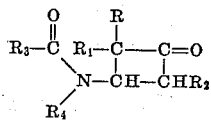

and the 3-amidocyclobutanol compounds having the formula:

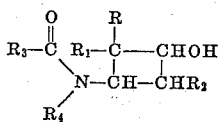

wherein R and $R_1$ each represents a member selected from the group consisting of hydrogen, an alkyl radical having 1 to 18 carbon atoms, phenyl, tolyl, methoxyphenyl, benzyl, allyl and a carbalkoxy radical wherein the alkoxy moeity has 1 to 8 carbon atoms and collectively, together with the carbon atom of the cyclobutane ring to which they are attached, represent a carbocyclic ring selected from the group consisting of cyclopentylidene, cyclohexylidene and cycloheptylidene, $R_2$ represents a member selected from the group consisting of hydrogen and an alkyl radical having 1 to 4 carbon atoms, $R_3$ and $R_4$ each represents a member selected from the group consisting of an alkyl radical having 1 to 4 carbon atoms, phenyl, tolyl, methoxyphenyl, ethoxyphenyl and wherein

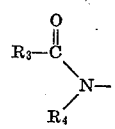

collectively represents a member selected from the group consisting of

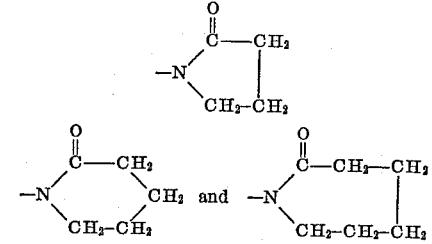

2. The 3-amidocyclobutanone compounds defined in claim 1.

3. The 3-amidocyclobutanol compounds defined in claim 1.

4. The 3-amidocyclobutanone compounds having the formula:

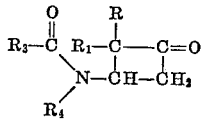

wherein R and R₁ each represents a member selected from the group consisting of an alkyl radical having 1 to 18 carbon atoms, phenyl, tolyl, methoxyphenyl, benzyl, allyl and a carbalkoxy radical wherein the alkoxy moiety has 1 to 8 carbon atoms and R₃ and R₄ each represents an alkyl radical having 1 to 4 carbon atoms.

5. The 3-amidocyclobutanone compounds having the formula:

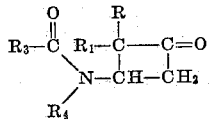

wherein R and R₁ each represents an alkyl radical having 1 to 8 carbon atoms and R₃ and R₄ each represents an alkyl radical having 1 to 4 carbon atoms.

6. The 3-amidocyclobutanone compounds having the formula:

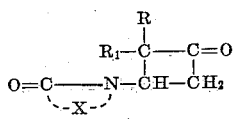

wherein R and R₁ each represents an alkyl radical having 1 to 8 carbon atoms and X represents an unsubstituted linear alkylene radical having 3 to 5 carbon atoms.

7. The 3-amidocyclobutanol compounds having the formula:

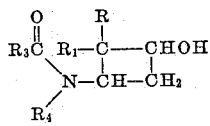

wherein R and R₁ each represents a member selected from the group consisting of an alkyl radical having 1 to 18 carbon atoms, phenyl, tolyl, methoxyphenyl, benzyl, allyl and a carbalkoxy radical wherein the alkoxy moiety has 1 to 8 carbon atoms and R₃ and R₄ each represents an alkyl radical having 1 to 4 carbon atoms.

8. The 3-amidocyclobutanol compounds having the formula:

$$R_3-\overset{O}{\overset{\|}{C}}\underset{R_4}{\diagdown}\overset{R}{\underset{|}{N}}-\overset{R_1-\overset{|}{C}---CHOH}{\underset{|}{CH-CH_2}}$$

wherein R and R₁ each represents an alkyl radical having 1 to 8 carbon atoms and R₃ and R₄ each represents an alkyl radical having 1 to 4 carbon atoms.

9. The 3-amidocyclobutanol compounds having the formula:

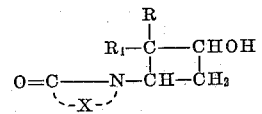

wherein R and R₁ each represents an alkyl radical having 1 to 8 carbon atoms and X represents an unsubstituted linear alkylene radical having 3 to 5 carbon atoms.

10. 2,2 - dimethyl - 3 - (N - n - propylacetamido)cyclobutanone.
11. 2,2 - dimethyl - 3 - (2 - oxopyrrolidinyl)cyclobutanone.
12. 2,2 - dimethyl - 3 - (N - n - propylbenzamido)cyclobutanone.
13. 2 - n - butyl - 2 ethyl - 3 - (N - methylacetamido)cyclobutanone.
14. N - (2,2 - dimethyl - 3 - oxocyclobutyl) - ε - caprolactam.
15. 2,2 - dimethyl - 3 - (N - n - propylacetamido)cyclobutanol.
16. 2,2 - dimethyl - 3 (N - n - propylbenzamido)cyclobutanone.
17. 2,2 - dimethyl - 3 - (2 - oxopyrrolidinyl)cyclobutanone.
18. N - (2,2 - dimethyl - 3 - hydroxycyclobutyl)-ε-caprolactam.

References Cited

UNITED STATES PATENTS 3,189,608   6/1965   Martin _____ 260—326.5

OTHER REFERENCES

Noller: "Chemistry of Organic Compounds," 2nd ed., pp. 760–762 (1937).

Noller: "Chemistry of Organic Compounds," 2nd ed., pp. 198–199 (Saunders), (1957).

WALTER A. MODANCE, *Primary Examiner.*

ROBERT T. BOND, *Assistant Examiner.*